(12) United States Patent
Wennerström

(10) Patent No.: US 6,540,804 B1
(45) Date of Patent: Apr. 1, 2003

(54) AIR CLEANER

(75) Inventor: Johan Wennerström, Sollentuna (SE)

(73) Assignee: Blue Air AB, Stockholm (SE)

( * ) Notice: Subject to any disclaimer, the term of this patent is extended or adjusted under 35 U.S.C. 154(b) by 0 days.

(21) Appl. No.: 09/856,548

(22) PCT Filed: Nov. 23, 1999

(86) PCT No.: PCT/SE99/02157

§ 371 (c)(1),
(2), (4) Date: May 23, 2001

(87) PCT Pub. No.: WO00/30732

PCT Pub. Date: Jun. 2, 2000

(30) Foreign Application Priority Data

Nov. 23, 1998 (SE) .............................................. 9803995

(51) Int. Cl.$^7$ ................................................. A47L 9/22
(52) U.S. Cl. ................... 55/472; 55/385.1; 55/476; 55/498; 55/506; 55/DIG. 3; 55/DIG. 39; 96/97; 96/98; 96/99; 15/352; 15/353
(58) Field of Search ............................... 96/66, 80, 99, 96/97, 98; 55/385.1, 472, 476, 490, 498, 506, DIG. 3, DIG. 39; 422/120, 121; 15/352, 353

(56) References Cited

U.S. PATENT DOCUMENTS

| 4,496,375 | A | * | 1/1985 | Le Jantine | 96/66 |
| 5,057,131 | A | * | 10/1991 | Lackwer et al. | 55/369 |
| 5,538,692 | A | * | 7/1996 | Joannou | 96/97 |
| 5,549,735 | A | * | 8/1996 | Lopporn | 96/63 |
| 5,603,791 | A | * | 2/1997 | Frey | 55/368 |
| 5,658,362 | A | * | 8/1997 | Frey | 55/368 |
| 5,660,493 | A | * | 8/1997 | Stephens | 15/328 |
| 5,769,916 | A | * | 6/1998 | Immel | 55/495 |
| 5,846,302 | A | * | 12/1998 | Putro | 96/66 |
| 6,110,248 | A | * | 8/2000 | Liu | 55/DIG. 3 |
| 6,113,663 | A | * | 9/2000 | Liu | 55/DIG. 3 |
| 6,341,404 | B1 | * | 1/2002 | Sato et al. | 55/DIG. 3 |
| 6,398,852 | B1 | * | 6/2002 | Loreth | 96/63 |

\* cited by examiner

*Primary Examiner*—David A. Simmons
*Assistant Examiner*—Minh-Chau T. Pham
(74) *Attorney, Agent, or Firm*—Young & Thompson

(57) ABSTRACT

An air cleaner includes a fan unit (1; 1') and a filter unit (3) that is entirely replaceable, where the fan unit (1; 1') and the filter unit (3) are mutually connected by a quick coupling and the filter unit includes a filter and an exterior casing that defines an exterior of the air cleaner when the air cleaner is in an operating position.

5 Claims, 3 Drawing Sheets

AIR CLEANER

TECHNICAL FIELD OF THE INVENTION

The present invention relates to an air cleaner comprising a fan unit and a filter unit.

PRIOR ART

In air cleaners of the type mentioned above the filter unit must be cleaned or exchanged at regular intervals. In connection therewith the filter unit is dismounted from the air cleaner, said filter unit normally being in the shape of a cartridge that either is cleaned or replaced by a new one. The actual dismounting of the filter unit may be difficult and time-consuming, several manipulations may be needed and it is in principle impossible for the operator to avoid to get one's hands dirty when handling the filter unit. A further disadvantage in connection with known air cleaners of the type mentioned above is that in connection to the frame or the like, in which the filter unit is mounted, a certain defilement occurs, said defilement has to be removed, which usually takes place in connection with the cleaning or the exchange of the filter unit. Apart from the fact that the cleaning/the exchange itself of the filter unit is difficult and time-consuming certain associated measures are also necessary.

OBJECTS AND FEATURES OF THE INVENTION

A primary object of the present invention is to define an air cleaner of the type mentioned above, where the exchange of filter unit is extremely simple to carry out. A further object of the invention is that the exchange of filter unit may be effected without the operator getting dirty. Still an object of the filter unit according to the present invention is that the exchange of filter unit should not initiate any further associated measures.

BRIEF DESCRIPTION OF THE DRAWINGS

Below a number of embodiments of the invention will be described, reference being made to the accompanying drawings, where.

DETAILED DESCRIPTION OF PREFERRED EMBODIMENTS

Figure 1:
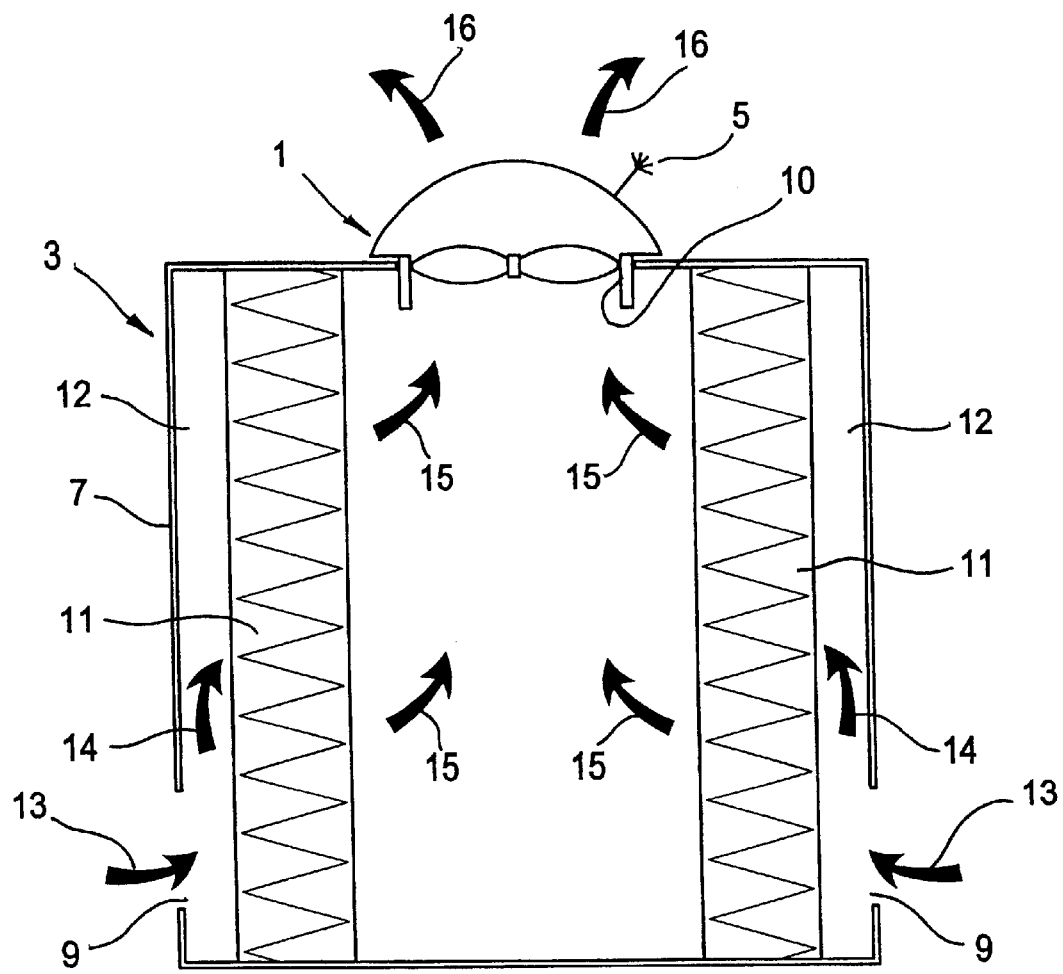
FIG. 1 shows a section through a first embodiment of a schematically disclosed air cleaner according to the present invention.

The air cleaner according to FIG. 1 includes a fan unit 1 and a filter unit 3. In the disclosed embodiment the air cleaner has the fan unit 1 oriented in such a way that its suction side is faces the interior of the filter unit 3, i.e. air is sucked in through the filter unit 3 and passes then through the fan unit 1, whose pressure side faces the air that surrounds the air cleaner. That is, cleaned air is forced by the fan unit outside the air cleaner. The fan unit 1 may have different shapes. Preferably, the fan unit constitutes a so-called electronic fan. Such fans are often of axial type and have a relatively small static pressure. This type of fan is normally used to cool electronics, e.g. computers, and not in applications that require a higher static pressure, e.g. air cleaners. However, if the filter medium area in an air cleaner is made sufficiently large, so-called electronic fans may be used also in air cleaners, e.g. of the type that the present invention represents.

In exemplifying and non-restricting purpose it is stated that Papst 4412 FGL has turned out to be a suitable fan unit, said fan normally being used for cooling electronics. This fan is of axial type and is fed by direct current having a voltage of 12V. The current intensity is 105 mA at a voltage of 12V, i.e. the effect fed to the fan is very low, more precisely 1,25 W. The fan is capable of handling only a very moderate static pressure, for a static counter pressure of 8 Pa the fan generates an air flow of 50 $m^3/h$. In a free blowing state the fan generates about 90 $m^3/h$.

As indicated in FIG. 1 an ionization device 5 may e.g. be provided on the fan unit 1, said ionization device 5 being in the shape of a graphite yarn brush. Thereby, so-called external ionization of the air that surrounds the air cleaner takes place, whereby an increased degree of separation may be achieved. In this connection it should be pointed out that the air cleaner according to the present invention does not need to have an ionization device.

The filter unit 3 according to the present invention is of so-called disposable type, i.e. it is not cleaned but replaced by a new filter unit while the dirty filter unit preferably is burned. Since the whole filter unit 3 is of disposable type, said filter unit 3 may without any inconveniences be provided with a large filter medium area in comparison to the volume of the filter unit 3.

The filter unit 3, schematically shown in FIG. 1, comprises a box shaped casing 7 that is provided with a number of inlet openings 9 and an outlet opening 10, the fan unit 1 being mounted in said outlet opening 10. In the disclosed embodiment the actual filter medium 11 is mounted a certain distance inside of the surfaces defining the casing 7. By this arrangement a slot 12 is provided between the casing 7 and the filter medium 11, said slot 12 distributing the inlet air substantially uniform over the entire filter medium area.

The arrows 13 symbolise the air entering the filter unit 3, the arrows 14 symbolise how the entering air is spread in the slot 12, the arrows 15 symbolise the cleaned air that passes through the filter medium 11 while the arrows 16 symbolise the air that exits the air cleaner.

In connection with replacement of a filter unit 3 in an air cleaner according to the present invention only the fan unit 1 is dismounted from the opening 10 in the filter unit 3, and then the fan unit 1 is mounted in a new filter unit 3 while the dirty filter unit 3 preferably is sent away to be burned. Dismounting/mounting of the fan unit 1 will be described more in detail below in connection with reference to FIG. 3.

The casing 7 is preferably manufactured in an environment friendly and combustible material, e.g. corrugated fibreboard. Another feasible material is "polypropylenwell", a corrugated fibreboard type material of polypropylene. Also the filter medium should be chosen as environment friendly as possible.

In order to achieve a sufficient air flow for air cleaning with the fan described above the filter medium incorporated in the filter unit must have a very low pressure drop, and in connection with the fan in question said pressure drop should not exceed 4 Pa, which results in a flow of about 80 $m^3/h$ using the fan in question.

In exemplifying and non-restricting purpose it is stated that a suitable filter medium has turned out to be BP 120 P 001, which is available from Camfill AB among others. According to the specifications this filter medium has a pressure drop of 30 Pa at a face velocity of 15 cm/s through the filter medium. If a filter medium area of 3 m² is used a pressure drop of 5 Pa is achieved at an air flow of 100 m³/h.

Generally, the degree of separation of a filter medium increases when the air velocity through the filter medium decreases. According to the specifications for the filter medium mentioned above, said filter medium has a degree of separation for particles >0,3 µm of about 25% at a face velocity of about 15 cm/s. At an air flow of 100 m³/h and a filter medium area of 3 m², i.e. a face velocity of about 1 cm/s, a degree of separation of about 85% has been registered for particles >0,3 µm, this being a significant increase. Apart from the fact that a lower pressure drop is achieved over the filter medium when the filter medium area is increased also an increased degree of separation is achieved.

Figure 2:
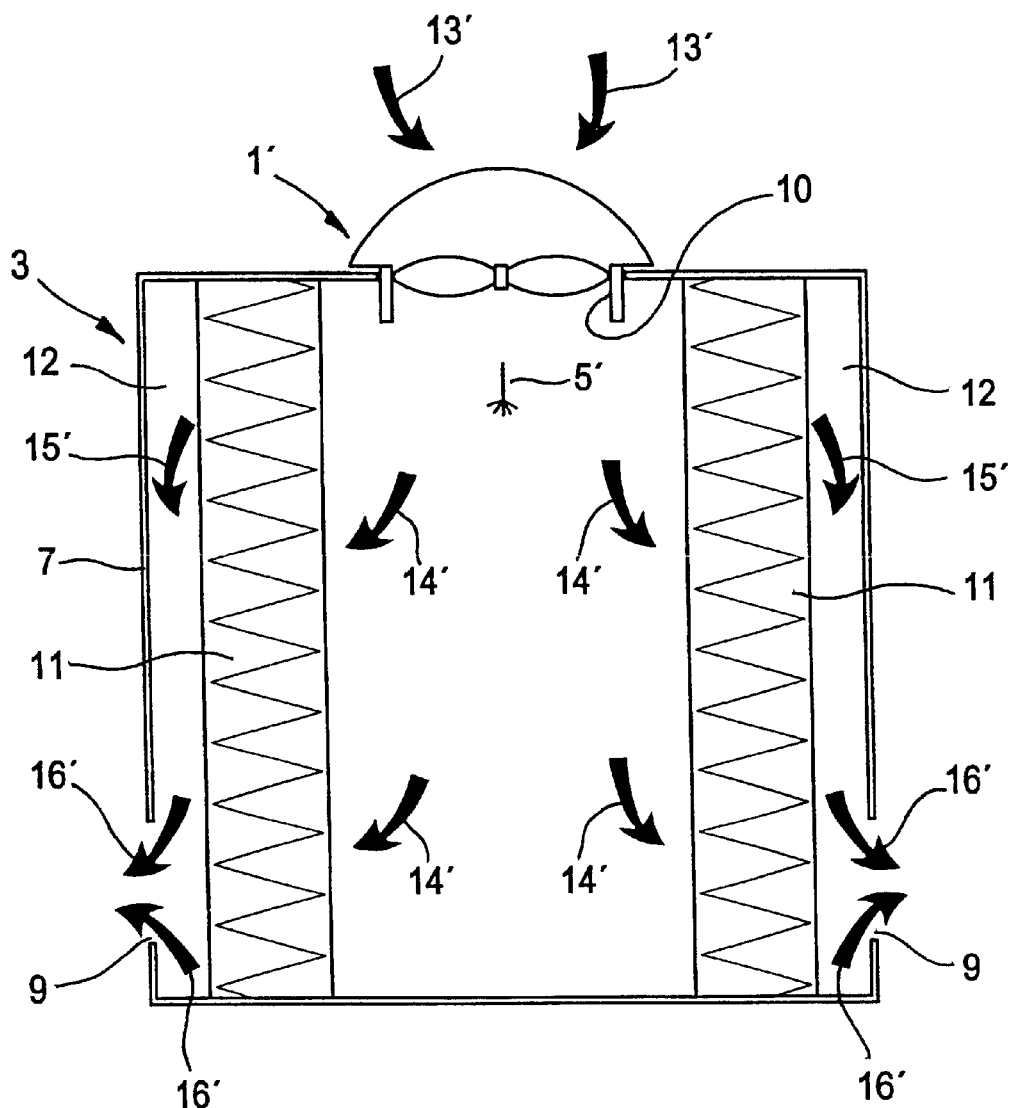
FIG. 2 shows a section through an alternative embodiment of a schematically disclosed air cleaner according to the present invention.

In the embodiment disclosed in FIG. 2 the air flow has reversed direction through the air cleaner compared to the embodiment according to FIG. 1. Otherwise the air cleaner according to FIG. 2 is structurally designed in a corresponding way as the air cleaner according to FIG. 1. Therefore, the structural design of the air cleaner disclosed in FIG. 2 is not described in detail, but reference is made to the description relating to FIG. 1. In FIG. 2 the corresponding reference numerals as in FIG. 1 have been used for identical details.

The fan unit in FIG. 2 has been given the reference numeral 1' since this fan unit 1' has been oriented with its suction side facing outwards towards the air that surrounds the air cleaner, while the pressure side of the fan unit 1' is facing towards the interior of the filter unit 3. This difference in orientation of the fan unit 1' does not imply any deterioration of the technical performance of the air cleaner compared to the embodiment according to FIG. 1. However, the fan unit 1' becomes dirty after a certain time of use since it continuously handles unfiltered air in contrast to the fan unit 1 of the embodiment according to FIG. 1, which handles filtered air.

Due to the direction of the air flow in the embodiment according to FIG. 2 the ionization device 5' is located inside the casing 7 at the pressure side of the fan unit 1', said ionization device 5' being in the shape of a graphite yarn brush. Thereby, so-called internal ionization is achieved. The air cleaner according to FIG. 2 does not need to have an ionization device 5'.

In FIG. 2 the arrows 13' symbolise the air entering the filter unit 3, the arrows 14' symbolise how the entering air is spread before it passes through the filter medium 11, the arrows 15' symbolise the cleaned air that has passed through the filter medium 11 while the arrows 16' symbolise the air that exits from the air cleaner.

Figure 3:
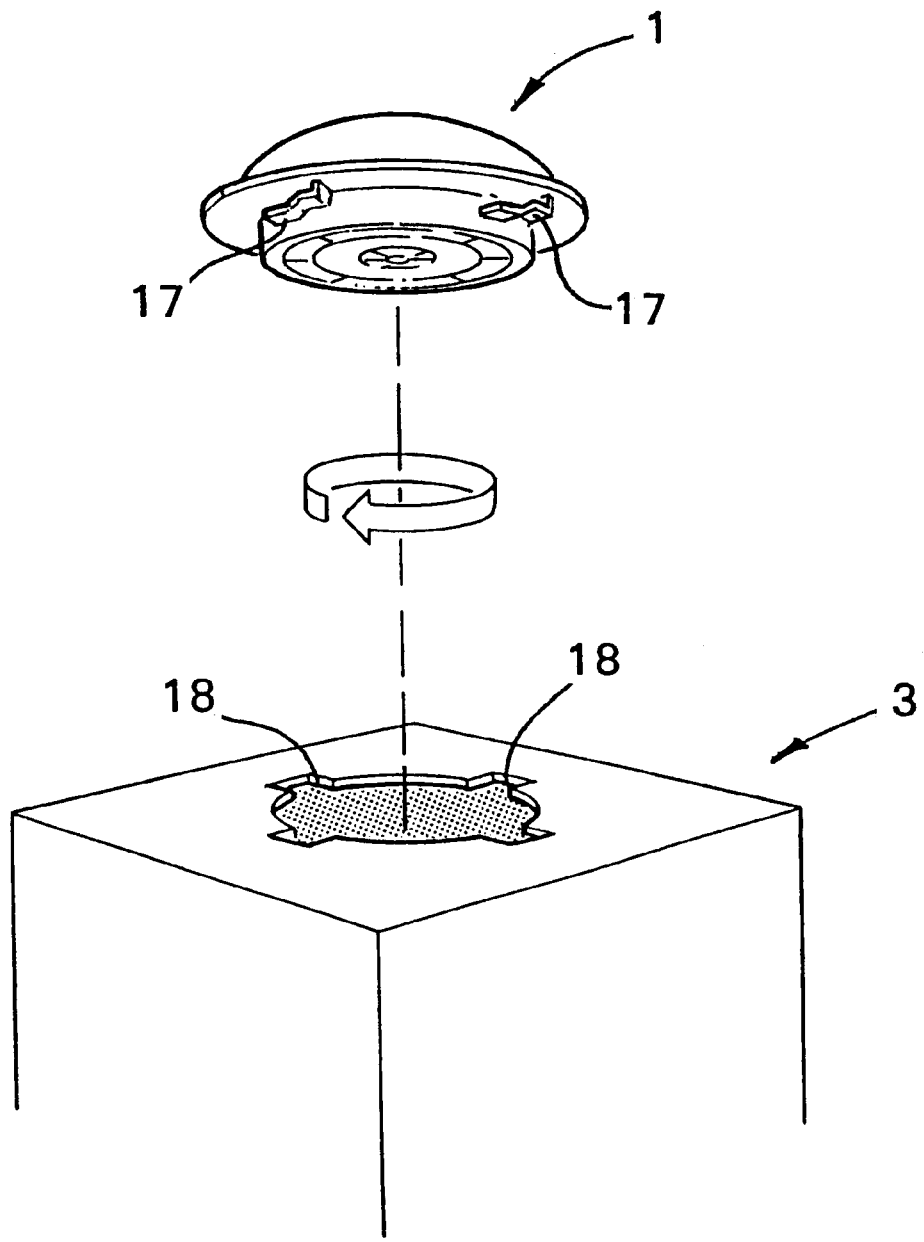
FIG. 3 shows in perspective an exploded view of a quick coupling for mutual connection of the fan unit and the filter unit.

In FIG. 3 is schematically illustrated a feasible quick coupling according the present invention, said quick coupling being located between the fan unit 1 and the filter unit 3. More precisely said quick coupling constitutes a socalled bayonet coupling between the fan unit 1 and the filter unit 3. A number of tongues 17 are provided on the fan unit 1 while a number of recesses 18 are provided in the opening 10 of the filter unit 3, said recesses 18 corresponding to the tongues 17. The bayonet coupling functions in a conventional way, i.e. when the fan unit 1 is mounted in the opening 10 of the filter unit 3 the tongues 17 are fitted in the recesses 18, the fan unit 1 is then rotated a certain angle and the fan unit 1 is connected to the filter unit 3 in a proper way. Dismounting is carried out in the reversed way, i.e. rotation of the fan unit 1 until the tongues 17 are facing the recesses 18 and then the fan unit 1 can be removed from the filter unit 3.

The principle of the present invention is based upon the fact that the filter unit 3 constitutes substantially the entire visual part of the air cleaner. The opening 10, which is adapted to receive the fan unit 1, constitutes only a minor part of the total external surface that defines the filter unit 3. According to the invention the area of the opening 10 constitutes less than 50% of the total external surface that defines the filter unit 3 and preferably the area of the opening 10 constitutes less than 25% of the total external surface that defines the filter unit 3. The corresponding reasoning is in principle also valid for the area of the fan unit 1, i.e. it should also constitutes only a minor part of the total external surface that defines the filter unit 3. Thus, the fan unit 1 has normally no extension worth mentioned outside the opening 10, in which the fan unit 1 is mounted. In this connection, the total external surface that defines the filter unit includes also the area that represents the openings of the filter unit, e.g. the mounting opening 10 of the fan unit 1 and the inlet openings 9.

Below, a number of examples will be given where a number of parameters have been allotted different values, which results in a certain degree of separation. Said examples are based on practical tests that have been carried out with a fan and a filter medium as specified above.

EXAMPLE 1

Filter medium area: 2,6 m²

Air flow through the filter medium: about 80 m³/h

Pressure drop over the filter medium: about 4 Pa

Degree of separation for the particles >0,3 µm: about 85%

EXAMPLE 2

Filter medium area: 1,3 m²

Air flow through the filter medium: about 30 m³/h

Pressure drop over the filter medium: about 10 Pa

Degree of separation for the particles >0,3 µm: about 70%

The examples show the importance of a large filter medium area, the fan used in these examples do not manage the higher pressure drop that is a consequence of a smaller filter area.

Feasible Modifications of the Invention

The quick coupling disclosed in FIG. 3 is of course only an example of a number of different feasible quick couplings. In exemplifying and non-restricting purpose alternative quick couplings in the shape of double sided adhesive tape, Velcro® tape and barbed spikes may be mentioned. In the pending patent application, by quick coupling should be understood a coupling that allows mutual connection of the fan unit and the filter unit by only a few manipulations.

The location of the fan unit 1 on a planar side of the filter unit 3 is only of feasible location. Within the scope of the invention it is for instance feasible to locate the fan unit on a truncated corner of the filter unit.

From FIG. 3 it is learnt that the casing 7 is in the shape of a parallelepiped. However, within the scope of the invention the shape of the casing may be varied in principle freely as long as the function of the air cleaner is not at risk.

How the filter medium is designed and located inside the casing may also be varied in many ways. Also in this case the function of the air cleaner must be considered.

Within the scope of the invention it is also feasible that the filter medium, apart from being a particle filter, also comprises a carbon filter that may be a separate unit or integrated with the particle filter. The filter medium may also solely constitute a carbon filter in case a device for separation of gas is to be provided.

What is claimed is:

1. An air cleaner, comprising:

a replaceable filter unit that is entirely disposable, said replaceable filter unit having first and second external surfaces that define an exterior of the air cleaner when the air cleaner is in an operating position, said first surface having a first opening therein, said first opening having a first quick coupling, said second surfaces having second openings therein;

said replaceable filter unit comprising at least one filter interior to and spaced from said second surfaces, said at least one filter being between and in gas communication with said first and second openings so that gas moving between said first and second openings must pass through said at least one filter;

a fan unit having a second quick coupling that couples to said first quick coupling to seat said fan unit in said first opening to cause gas to move between said first and second openings when said fan unit is operated, said fan unit being separable from said replaceable filter unit using said first and second quick couplings and said replaceable filter unit being entirely disposable when said at least one filter is to be changed.

2. The air cleaner of claim 1, wherein said filter unit is a rectangular parallelepiped and wherein said first surface is an end thereof and said second surfaces are sides adjacent to said end.

3. The air cleaner of claim 2, wherein said at least one filter comprises plural filters that are each interior to and spaced from a respective one of said second surfaces.

4. The air cleaner of claim 1, wherein said at least one filter comprises plural filters that are each interior to and spaced from a respective one of said second surfaces.

5. The air cleaner of claim 1, wherein said first and second quick couplings are bayonet couplings.

* * * * *